US008993489B2

(12) United States Patent
McDaniel et al.

(10) Patent No.: US 8,993,489 B2
(45) Date of Patent: Mar. 31, 2015

(54) COATED AND CURED PROPPANTS

(75) Inventors: Robert Ray McDaniel, Cypress, TX (US); Avis Lloyd McCrary, Montgomery, TX (US)

(73) Assignee: Preferred Technology, LLC, Radnor, PA (US)

( * ) Notice: Subject to any disclaimer, the term of this patent is extended or adjusted under 35 U.S.C. 154(b) by 255 days.

(21) Appl. No.: 13/099,893

(22) Filed: May 3, 2011

(65) Prior Publication Data
US 2012/0279703 A1    Nov. 8, 2012

(51) Int. Cl.
C09K 8/60      (2006.01)
C09K 8/36      (2006.01)
E21B 43/267    (2006.01)
C09K 8/80      (2006.01)

(52) U.S. Cl.
CPC .............. *C09K 8/805* (2013.01); *Y10S 507/924* (2013.01)
USPC .......... 507/219; 507/129; 507/924; 166/280.1

(58) Field of Classification Search
USPC ........................... 507/129, 219, 924; 166/280
See application file for complete search history.

(56) References Cited

U.S. PATENT DOCUMENTS

| | | | |
|---|---|---|---|
| 2,823,753 A | 2/1958 | Henderson | |
| 3,026,938 A | 9/1958 | Huitt | |
| 3,805,531 A | 4/1974 | Kistner | |
| 3,929,191 A | 12/1975 | Graham | |
| 3,976,135 A | 8/1976 | Anderson | |
| 4,074,760 A | 2/1978 | Copeland | |
| 4,113,014 A | 9/1978 | Kubens | |
| 4,199,484 A | 4/1980 | Murphey | |
| 4,273,910 A | 6/1981 | Lederer | |
| 4,443,347 A | 4/1984 | Underdown | |
| 4,518,039 A | 5/1985 | Graham | |
| 4,785,884 A | 11/1988 | Armbruster | |
| 4,792,262 A * | 12/1988 | Kapps et al. ................... | 405/264 |
| 4,920,192 A | 4/1990 | Wiser-Halladay | |
| 5,048,608 A | 9/1991 | Wiser-Halladay | |
| 5,188,175 A | 2/1993 | Sweet | |
| 5,199,491 A | 4/1993 | Kutta | |
| 5,256,729 A | 10/1993 | Kutta | |
| 5,582,249 A | 12/1996 | Caveny | |
| 5,721,315 A | 2/1998 | Evans | |
| 5,733,952 A * | 3/1998 | Geoffrey ....................... | 523/143 |
| 5,924,488 A | 7/1999 | Nguyen | |
| 6,079,492 A | 6/2000 | Hoogteijling | |
| 6,093,469 A | 7/2000 | Callas | |
| 6,114,410 A | 9/2000 | Betzold | |
| 6,306,964 B1 | 10/2001 | Evans | |
| 6,387,501 B1 | 5/2002 | McCrary | |
| 6,406,789 B1 | 6/2002 | McDaniel | |
| 6,528,157 B1 | 3/2003 | Hussain | |
| 6,582,819 B2 | 6/2003 | McDaniel | |
| 6,632,527 B1 | 10/2003 | McDaniel | |
| 6,668,926 B2 | 12/2003 | Nguyen | |
| 6,705,400 B1 | 3/2004 | Nguyen | |
| 6,866,099 B2 | 3/2005 | Nguyen | |
| 7,012,043 B2 | 3/2006 | Klein | |
| 7,078,442 B2 | 7/2006 | Brown | |
| 7,135,231 B1 | 11/2006 | Sinclair | |
| 7,153,575 B2 | 12/2006 | Anderson | |
| 7,216,711 B2 | 5/2007 | Nguyen | |
| 7,261,156 B2 | 8/2007 | Nguyen | |
| 7,270,879 B2 | 9/2007 | McCrary | |
| 7,281,581 B2 | 10/2007 | Nguyen | |
| 7,318,472 B2 | 1/2008 | Smith | |
| 7,318,474 B2 | 1/2008 | Welton | |
| 7,322,411 B2 | 1/2008 | Brannon | |
| 7,334,635 B2 | 2/2008 | Nguyen | |
| 7,343,973 B2 | 3/2008 | Dusterhoft | |
| 7,350,571 B2 | 4/2008 | Nguyen | |
| 7,407,010 B2 | 8/2008 | Rickman | |
| 7,528,096 B2 | 5/2009 | Brannon | |
| 7,624,802 B2 | 12/2009 | McCrary | |
| 7,726,399 B2 | 6/2010 | Brannon | |
| 7,754,659 B2 | 7/2010 | Rediger | |
| 7,772,163 B1 | 8/2010 | Brannon | |
| 7,789,147 B2 | 9/2010 | Brannon | |
| 7,919,183 B2 | 4/2011 | McDaniel | |
| 2002/0048676 A1 | 4/2002 | McDaniel | |
| 2003/0131998 A1 | 7/2003 | Nguyen | |
| 2003/0224165 A1 | 12/2003 | Anderson | |
| 2004/0129923 A1 * | 7/2004 | Nguyen et al. ......... | 252/301.4 R |
| 2005/0019574 A1 | 1/2005 | McCrary | |
| 2006/0073980 A1 * | 4/2006 | Brannon et al. .............. | 507/103 |
| 2007/0021309 A1 | 1/2007 | Bicerano | |
| 2007/0161515 A1 | 7/2007 | Bicerano | |
| 2007/0204992 A1 | 9/2007 | Davis | |
| 2007/0208156 A1 | 9/2007 | Posey | |
| 2007/0209794 A1 | 9/2007 | Kaufman | |
| 2007/0215354 A1 | 9/2007 | Rickman | |
| 2008/0202744 A1 | 8/2008 | Crews | |
| 2008/0202750 A1 | 8/2008 | Rediger | |
| 2008/0230223 A1 | 9/2008 | McCrary | |
| 2009/0238988 A1 | 9/2009 | McDaniel | |
| 2010/0065271 A1 | 3/2010 | McCrary | |
| 2011/0244125 A1 | 10/2011 | Weisenberg | |
| 2011/0272146 A1 | 11/2011 | Green | |
| 2011/0297383 A1 | 12/2011 | Tanguay | |
| 2012/0018162 A1 | 1/2012 | Tanguay | |

FOREIGN PATENT DOCUMENTS

WO    2010/049467    5/2010

OTHER PUBLICATIONS

"Polyurethanes", Ullmann's Encyclopedia of Industrial Chemistry, 2012, vol. 29.*

(Continued)

*Primary Examiner* — Alqun Li
(74) *Attorney, Agent, or Firm* — Johnson Legal, PLLC

(57) ABSTRACT

Solid proppants are coated with a phenol-urethane coating in one or more layers by a method comprising coating a proppant solid and then curing the coated proppant under conditions sufficient to substantially cure said proppant, wherein said coating comprises a substantially homogeneous mixture of (i) an isocyanate component having at least 2 isocyanate groups, (ii) an amine reactant, and optionally (iii) an amine that is a latent curing agent for said isocyanate.

19 Claims, No Drawings

(56) References Cited

OTHER PUBLICATIONS

The removal of heavy metal cations by natural zeolites, http://www.resultsrma.com/research/zeolite_binds_heavy_metals.php, pp. 3-7.

Wingenfelder, Ulla et al., Removal of Heavy Metals from Mine Waters by Natural Zeolites, Environ. Sci. Technol., 2005, vol. 39, 4606-4613.

Halimoon, Normala, Removal of Heavy Metals from Textile Wastewater Using Zeolite, EnvironmentAsia 3(special issue) 2010, 124-130.

Wikipedia, Methylene diphenyl diisocyanate, http://en.wikipedia.org/wiki/Methylene_diphenyl_diisocyanate.

CARBO Ceramics, Topical Reference, Physical Properties of Proppants, pp. 1-5.

Huntsman, Performance products JEFFCAT catalysts for the Polyurethane Industry—Asia-Pacific, pp. 1-6.

Huntsman, JEFFCAT Amine Catalysts for the Polyurethane Industry—Americas Region.

Sanchez, Mariano, FRAC Packing: Fracturing for Sand Control, Middle East and Asia Reservoir Review, Nov. 8, 2007, pp. 37-49.

Interstate Oil and Gas Compact Commission and All Consulting, A Guide to Practical Management of Produced Water from Onshore Oil and Gas Operations in the United States, Oct. 2006.

Boster, Ronald S., A Study of Ground-Water Contamination Due to Oil-Field Brines in Morrow and Delaware Counties, Ohio, With Emphasis on Detection Utilizing Electrical Resistivity Techniques, The Ohio State University, 1967.

EPA, Oil and Gas Extraction, Compliance and Enforcement History, Sector Notebook Project, Oct. 2000, pp. 115-155.

Huntsman, The JEFFAMINE Polyetheramines, 2007.

* cited by examiner

COATED AND CURED PROPPANTS

FIELD OF INVENTION

The invention relates to a method for the production of coated proppants, and also to the proppants obtained according to this method, to the uses thereof and to methods which use the proppants.

BACKGROUND OF THE INVENTION

Well fracturing is an often used technique to increase the efficiency and productivity of oil and gas wells. Overly simplified, the process involves the introduction of a fracturing fluid into the well and the use of fluid pressure to fracture and crack the well strata. The cracks allow the oil and gas to flow more freely from the strata and thereby increase production rates in an efficient manner.

There are many detailed techniques involved in well fracturing, but one of the most important is the use of a solid "proppant" to keep the strata cracks open as oil, gas, water and other fluids found in well flow through those cracks. The proppant is carried into the well with the fracturing fluid which itself may contain a variety of viscosity enhancers, gelation agents, surfactants, etc. These additives also enhance the ability of the fracturing fluid to carry proppant to the desired strata depth and location. The fracturing fluid for a particular well may or may not use the same formulation for each depth in the strata.

Proppants can be made of virtually any generally solid particle that has a sufficiently high crush strength to prop open cracks in a rock strata at great depth and temperatures of about 125° C. and higher. Sand and ceramic proppants have proved to be especially suitable for commercial use.

A proppant that is flushed from the well is said to have a high "flow back." Flow back is undesirable. In addition to closure of the cracks, the flushed proppants are abrasive and can damage or clog valves and pipelines in downstream processing facilities.

Synthetic resin coatings can be used to impart a degree of adhesion to the proppant so that flow back is substantially reduced or eliminated. Such resins can include phenol resin, epoxy resin, polyurethane-phenol resin, furane resin, etc. See published US Patent Application Nos. 2002/0048676, 2003/0131998, 2003/0224165, 2005/0019574, 2007/0161515 and 2008/0230223 as well as U.S. Pat. Nos. 4,920,192; 5,048,608; 5,199,491; 6,406,789; 6,632,527; 7,624,802; and published international application WO 2010/049467, the disclosures of which are herein incorporated by reference.

With some coatings, the synthetic coating is not completely cured when the proppant is introduced into the well. The coated, partially-cured proppants are pourable, but the coating resin is still slightly thermoplastic. The final cure is intended to occur in situ in the strata fracture at the elevated pressures and temperatures found "down hole."

Unfortunately, partial curing of coatings on sand-sized proppants is extremely difficult to control in a reproducible manner. The stresses on package stacking, the temperatures experienced in warehouse storage during storage and temperature stress upon introduction of the proppants into the strata can all raise the temperature sufficiently to cause uncontrolled post-curing at undesirable times. As one might imagine, such instability and handling difficulties have effectively limited the use of post-cure coatings in proppants for oil and gas wells.

Proppants based on polyurethane chemistries have a number of potential advantages over phenol resin systems. Most notably, the reaction rates used to make polyurethane coatings are generally faster than phenol resins, cure at lower temperatures and do not have gaseous emissions that require specialized recovery equipment. The coating step with polyurethanes can be carried out at temperatures of about 10° C. to about 50° C. Polyurethane coatings can also be performed without the use of solvents, whereas many of the known methods, as a rule, require organic solvents for the resinous coating. The components in polyurethane systems are also generally easier to use and pose lower environmental issues. These factors could reduce the cost to make coated proppants and could also permit the coating process to be moved to the site of the well head.

Polyurethanes have not, however, achieved widespread adoption due to relatively high flow back ratios at the down hole conditions and low coating levels needed to permit the proppant to enter the very small fractures in a stratum. The coated proppant simply flows back up out of the well and does not become lodged therein in sufficient quantities to maintain conductivity.

SUMMARY OF THE INVENTION

It would be desirable to have a polyurethane-based proppant coating that would enhance proppant retention within a fractured well field stratum while retaining good conductivity of the fractured well field.

It would also be desirable to have a polyurethane coated proppant that retained its coating under the conditions prevailing within an actively producing well field stratum.

These and other objectives of the invention that will become apparent from the description herein can be accomplished by a polyurethane coating and coating process that comprises the step of:

coating a proppant solid with a substantially homogeneous mixture of (i) an isocyanate component having at least 2 isocyanate groups, (ii) an amine reactant, and optionally (iii) an amine that is a latent curing agent for said isocyanate under conditions sufficient to substantially cure said proppant coating.

A coated proppant according to the invention comprises a solid proppant core particle that is substantially covered with a coating made from the at least substantially cured, reaction product of an isocyanate component, an amine reactant and, optionally, an amine-based latent curing agent and, optionally, a polyol.

The use of one or more amine-functional materials in the formulation of the coating permit the coating or each coating layer to become at least substantially cured and thereby develop adequate resistance to dissolution that the coating will remain adhered to the proppant solid at the rigorous conditions found at well depths. The additional heat and curing time provided by the coating process of the present invention causes the polyurethane coating components to crosslink fully and thereby reduce what water solubility might remain in the coating from unreacted components. The result is a substantially cured, polyurethane coating that exhibits an acceptably low rate of flow back with a faster, less expensive coating process that requires less capital than comparable phenol resin-based coatings.

DETAILED DESCRIPTION OF THE INVENTION

The coating formulation of the present invention includes a substantially homogeneous mixture that comprises: (a) an isocyanate reactant, (b) a polyol reactant which may or may not have reactive amine functionality, (c) an amine reactant, and (d) optionally an amine-based, latent curing agent.

The coating process of the present invention applies one or more layers of cured polyurethane around a solid proppant core that is substantially cured and crosslinked to resist dissolution under the rigorous combination of high heat, agitation, abrasion and water found downhole in a well. Preferably, the cured coating exhibits a sufficient resistance to a 10 day autoclave test or 10 day conductivity test so that the coating resists loss by dissolution in hot water ("LOI loss") of less than 25 wt %, more preferably less than 15 wt %, and even more preferably a loss of less than 5 wt %. The substantially cured coating of the invention thus resists dissolution in the fractured stratum while also exhibiting sufficient resistance to flow back and sufficiently high crush strength to maintain conductivity of the fractures.

A preferred testing method for is described in ISO 13503-5:2006(E) "Procedures for measuring the long term conductivity of proppants", the disclosure of which is herein incorporated by reference. ISO 13503-5:2006 provides standard testing procedures for evaluating proppants used in hydraulic fracturing and gravel packing operations. ISO 13503-5:2006 provides a consistent methodology for testing performed on hydraulic fracturing and/or gravel packing proppants. The "proppants" mentioned henceforth in this part of ISO 13503-5:2006 refer to sand, ceramic media, resin-coated proppants, gravel packing media, and other materials used for hydraulic fracturing and gravel-packing operations. ISO 13503-5:2006 is not applicable for use in obtaining absolute values of proppant pack conductivities under downhole reservoir conditions, but it does serve as a consistent method by which such downhole conditions can be simulated and compared in a laboratory setting.

The Isocyanate Component

The isocyanate component comprises an isocyanate with at least 2 reactive isocyanate groups. Other isocyanate-containing compounds may be used, if desired. Examples of suitable isocyanate with at least 2 isocyanate groups an aliphatic or an aromatic isocyanate with at least 2 isocyanate groups (e.g. a diisocyanate, triisocyanate or tetraisocyanate), or an oligomer or a polymer thereof can preferably be used. These isocyanates with at least 2 isocyanate groups can also be carbocyclic or heterocyclic and/or contain one or more heterocyclic groups.

The isocyanate with at least 2 isocyanate groups is preferably a compound of the formula (III) or a compound of the formula (IV):

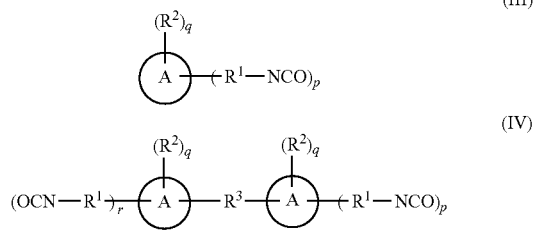

In the formulas (III) and (IV), A is each, independently, an aryl, heteroaryl, cycloalkyl or heterocycloalkyl. Preferably, A is each, independently, an aryl or cycloalkyl. More preferably A is each, independently, an aryl which is preferably phenyl, naphthyl or anthracenyl, and most preferably phenyl. Still more preferably A is a phenyl.

The above mentioned heteroaryl is preferably a heteroaryl with 5 or 6 ring atoms, of which 1, 2 or 3 ring atoms are each, independently, an oxygen, sulfur or nitrogen atom and the other ring atoms are carbon atoms. More preferably the heteroaryl is selected among pyridinyl, thienyl, furyl, pyrrolyl, imidazolyl, pyrazolyl, pyrazinyl, pyrimidinyl, pyridazinyl, oxazolyl, isoxazolyl or furazanyl.

The above mentioned cycloalkyl is preferably a $C_{3-10}$-cycloalkyl, more preferably a $C_{5-7}$-cycloalkyl.

The above mentioned heterocycloalkyl is preferably a heterocycloalkyl with 3 to 10 ring atoms (more preferably with 5 to 7 ring atoms), of which one or more (e.g. 1, 2 or 3) ring atoms are each, independently, an oxygen, sulfur or nitrogen atom and the other ring atoms are carbon atoms. More preferably the heterocycloalkyl is selected from among tetrahydrofuranyl, piperidinyl, piperazinyl, aziridinyl, acetidinyl, pyrrolidinyl, imidazolidinyl, morpholinyl, pyrazolidinyl, tetrahydrothienyl, octahydroquinolinyl, octahydroisoquinolinyl, oxazolidinyl or isoxazolidinyl. Still more preferably, the heterocycloalkyl is selected from among tetrahydrofuranyl, piperidinyl, piperazinyl, pyrrolidinyl, imidazolidinyl, morpholinyl, pyrazolidinyl, tetrahydrothienyl, oxazolidinyl or isoxazolidinyl.

In the formulas (III) and (IV), each $R^1$ is, independently, a covalent bond or $C_{1-4}$-alkylene (e.g. methylene, ethylene, propylene or butylene). Preferably each $R^2$ is a covalent bond.

In the formulas (III) and (IV), each $R^2$ is each, independently, a halogen (e.g. F, Cl, Br or I), a $C_{1-4}$alkyl (e.g. methyl, ethyl, propyl or butyl) or $C_{1-4}$-alkyoxy (e.g. methoxy, ethoxy, propoxy or butoxy). Preferably, each $R^2$ is, independently, a $C_{1-4}$-alkyl. More preferably each $R^2$ is methyl.

In the formula (IV), $R^3$ is a covalent bond, a $C_{1-4}$-alkylene (e.g. methylene, ethylene, propylene or butylene) or a group —$(CH_2)_{R31}$—O—$(CH_2)_{R32}$—, wherein R31 and R32 are each, independently, 0, 1, 2 or 3. Preferably, $R^3$ is a —$CH_2$— group or an —O— group.

In the formula (III), p is equal to 2, 3 or 4, preferably 2 or 3, more preferably 2.

In the formulas (III) and (IV), each q is, independently, an integer from 0 to 3, preferably 0, 1 or 2. When q is equal to 0, the corresponding group A has no substitutent $R^2$, but has hydrogen atoms instead of $R^2$.

In the formula (IV), each r and s are, independently, 0, 1, 2, 3 or 4, wherein the sum of r and s is equal to 2, 3 or 4. Preferably, each r and s are, independently, 0, 1 or 2, wherein the sum of r and s is equal to 2. More preferably, r is equal to 1 and s is equal to 1.

Examples of the isocyanate with at least 2 isocyanate groups are: toluol-2,4-diisocyanate; toluol-2,6-diisocyanate; 1,5-naphthalindiisocyanate; cumol-2,4-diisocyanate; 4-methoxy-1,3-phenyldiisocyanate; 4-chloro-1,3-phenyldiisocyanate; diphenylmethane-4,4-diisocyanate; diphenylmethane-2,4-diisocyanate; diphenylmethane-2,2-diisocyanate; 4-bromo-1,3-phenyldiisocyanate; 4-ethoxy-1,3-phenyldiisocyanate; 2,4'-diisocyanate diphenylether; 5,6-dimethyl-1,3-phenyl-diisocyanate; 2,4-dimethyl-1,3-phenyldiisocyanate; 4,4-diisocyanato-diphenylether; 4,6-dimethyl-1,3-phenyldiisocyanate; 9,10-anthracene-diisocyanate; 2,4,6-toluol triisocyanate; 2,4,4'-triisocyanatodiphenylether; 1,4-tetramethylene diisocyanate; 1,6-hexamethylene diisocyanate; 1,10-decamethylene-diisocyanate; 1,3-cyclohexylene diisocyanate; 4,4'-methylene-bis-(cyclohexylisocyanate); xylol diisocyanate; 1-isocyanato-3-methyl-isocyanate-3,5,5-trimethylcyclohexane (isophorone diisocyanate); 1-3-bis(isocyanato-1-methylethyl)benzol (m-TMXDI); 1,4-bis(isocyanato-1-methylethyl) benzol (p-TMXDI); oligomers or polymers of the above mentioned isocyanate compounds; or mixtures of two or more of the above mentioned isocyanate compounds or oligomers or polymers thereof.

Particularly preferred isocyanates with at least 2 isocyanate groups are toluol diisocyanate, diphenylmethane diisocyanate, an oligomer based on toluol diisocyanate or an oligomer based on diphenylmethane diisocyanate.

The Polyol Component

A polyol component can be added to the coating formulation. The polyol component may or may not have reactive amine functionality. An especially preferred polyurethane coating is a phenolic polyurethane made with a phenolic polyol according to a patent application that was filed with the German Patent Office under no. DE 10 2010 051 817.4 on Nov. 19, 2010 and entitled "Proppant Coating Technology", the disclosure of which is herein incorporated by reference and summarized below in the context of the process of the present invention.

Another preferred polyol component for the present process comprises a phenol resin that comprises a condensation product of a phenol and an aldehyde, such as formaldehyde. The phenol resin is preferably a resole or novolak phenol resin and more preferably a benzyl ether resin.

The resole-type phenol resin can be obtained, for example, by condensation of phenol or of one or more compounds of the following formula (I), with aldehydes, preferably formaldehyde, under basic conditions.

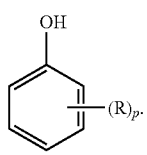

In the formula (I):
"R" is in each case, independently, a hydrogen atom, a halogen atom, $C_{1-16}$-alkyl (preferably $C_{1-12}$-alkyl, more preferably $C_{1-6}$-alkyl, and still more preferably methyl, ethyl, propyl or butyl) or —OH;
"p" is an integer from 0 to 4, preferably 0, 1, 2 or 3, and more preferably 1 or 2. Those in the art will understand that when p is 0, the compound of formula (I) is phenol.

Novolak-type phenol resin for the present invention comprises the condensation product of phenol or of one or more compounds of the formula (I) defined above, with aldehydes, preferably formaldehyde, under acidic conditions.

In another preferred embodiment, the phenol resin is a benzyl ether resin of the general formula (II):

In the formula (II):
A, B and D each are, independently, a hydrogen atom, a halogen atom, a $C_{1-16}$-hydrocarbon residue, —($C_{1-16}$-alkylene)-OH, —OH, an —O—($C_{1-16}$-hydrocarbon residue), phenyl, —($C_{1-6}$-alkylene)-phenyl, or —($C_{1-6}$-alkylene)-phenylene-OH;

The halogen atom is F, Cl, Br or I;

The $C_{1-16}$-hydrocarbon-residue is preferably $C_{1-16}$-alkyl, $C_{2-16}$-alkenyl or $C_{2-16}$-alkinyl, more preferably $C_{1-12}$-alkyl, $C_{2-12}$-alkenyl or $C_{2-12}$-alkinyl, still more preferably $C_{1-6}$-alkyl, $C_{2-6}$-alkenyl or $C_{2-6}$-alkinyl, and still more preferably $C_{1-4}$-alkyl, $C_{2-4}$-alkenyl or $C_{2-4}$-alkinyl, and still more preferably $C_{1-12}$-alkyl, and still more preferably $C_{1-6}$-alkyl, and still more preferably methyl, ethyl, propyl or butyl, and most preferably methyl;

The residue —($C_{1-16}$-alkylene)-OH is preferably —($C_{1-12}$-alkylene)-OH, more preferably —($C_{1-6}$-alkylene)-OH, and still more preferably —($C_{1-4}$-alkylene)-OH, and most preferably a methylol group (—$CH_2$—OH);

The —O—($C_{1-16}$-hydrocarbon)-residue is preferably $C_{1-16}$-alkoxy, more preferably $C_{1-12}$-alkoxy, and still more preferably $C_{1-6}$-alkoxy, and still more preferably $C_{1-4}$-alkoxy, and still more preferably —O—$CH_3$, —O—$CH_2CH_3$, —O—$(CH_2)_2CH_3$ or —O—$(CH_2)_3CH_3$;

The residue —($C_{1-6}$-alkylene)-phenyl is preferably —($C_{1-4}$-alkylene)-phenyl, and more preferably —$CH_2$-phenyl;

The residue —($C_{1-6}$-alkylene)-phenylene-OH is preferably —($C_{1-4}$-alkylene)-phenylene-OH, and more preferably —$CH_2$-phenylene-OH;

R is a hydrogen atom of a $C_{1-6}$-hydrocarbon residue (e.g. linear or branched $C_{1-6}$-alkyl). R is particularly preferred as a hydrogen atom. This is the case, for example, when formaldehyde is used as aldehyde component in a condensation reaction with phenols in order to produce the benzyl ether resin of the formula (II);

$m^1$ and $m^2$ are each, independently, 0 or 1.

n is an integer from 0 to 100, preferably an integer from 1 to 50, more preferably from 2 to 10, and still more preferably from 2 to 5; and wherein the sum of n, $m^1$ and $m^2$ is at least 2.

In a still further embodiment, the polyol component is a phenol resin with monomer units based on cardol and/or cardanol. Cardol and cardanol are produced from cashew nut oil which is obtained from the seeds of the cashew nut tree. Cashew nut oil consists of about 90% anacardic acid and about 10% cardol. By heat treatment in an acid environment, a mixture of cardol and cardanol is obtained by decarboxylation of the anacardic acid. Cardol and cardanol have the structures shown below:

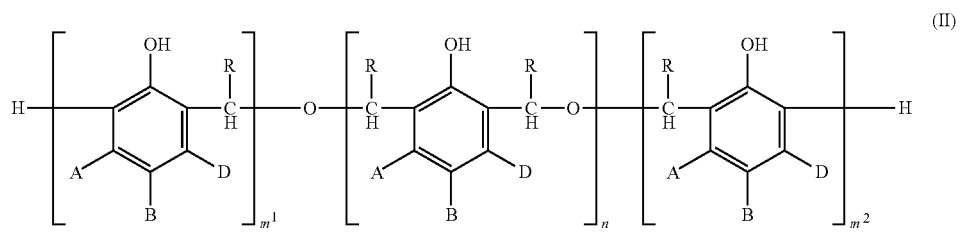

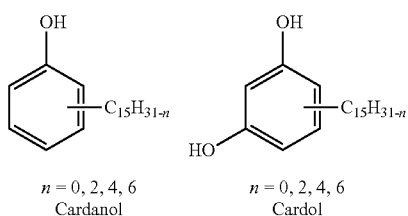

$n = 0, 2, 4, 6$  
Cardanol $n = 0, 2, 4, 6$  
Cardol

As shown in the illustration above, the hydrocarbon residue (—$C_{15}H_{31-n}$) in cardol and/or in cardanol can have one (n=2), two (n=4) or three (n=6) double bonds. Cardol specifically refers to compound CAS-No. 57486-25-6 and cardanol specifically to compound CAS-No. 37330-39-5.

Cardol and cardanol can each be used alone or at any particular mixing ratio in the phenol resin. Decarboxylated cashew nut oil can also be used.

Cardol and/or cardanol can be condensed into the above described phenol resins, for example, into the resole- or novolak-type phenol resins. For this purpose, cardol and/or cardanol can be condensed e.g. with phenol or with one or more of the above defined compounds of the formula (I), and also with aldehydes, preferably formaldehyde.

The amount of cardol and/or cardanol which is condensed in the phenol resin is not particularly restricted and preferably is from about 1 wt % to about 99 wt %, more preferably about 5 wt % to about 60 wt %, and still more preferably about 10 wt % to about 30 wt %, relative to 100 wt % of the amount of phenolic starting products used in the phenol resin.

In another embodiment, the polyol component is a phenol resin obtained by condensation of cardol and/or cardanol with aldehydes, preferably formaldehyde.

A phenol resin which contains monomer units based on cardol and/or cardanol as described above, or which can be obtained by condensation of cardol and/or cardanol with aldehydes, has a particularly low viscosity and can thus preferably be employed with a low addition or without addition of reactive thinners. Moreover, this kind of long-chain, substituted phenol resin is comparatively hydrophobic, which results in a favorable shelf life of the coated proppants obtained by the method according to the present invention. In addition, a phenol resin of this kind is also advantageous because cardol and cardanol are renewable raw materials.

Apart from the phenol resin, the polyol component can still contain other compounds containing hydroxyl groups. The other compounds containing hydroxyl groups can be selected from the compounds containing hydroxyl groups that are known to be useful for making polyurethanes, e.g., hydroxy-functional polyethers, hydroxy-functional polyesters, alcohols or glycols. One preferred compound containing hydroxyl groups is, for instance, castor oil. Compounds containing hydroxyl groups such as alcohols or glycols, in particular cardol and/or cardanol, can be used as reactive thinners.

The amount of the other compounds containing hydroxyl groups depends on the desired properties of the proppant coating and can suitably be selected by the person skilled in the art. Typical amounts of compounds containing hydroxyl groups are in the range of between about 10 wt % and about 80 wt %, preferably from about 20 wt % to about 70 wt %, relative to 100 wt % of the polyol component.

The process of the present invention is particularly useful when the proppants are coated with a condensation reaction product that has been made with an excess of isocyanate component with respect to the polyol component. In step (a) therefore, 100 parts by weight of the polyol component is used with about 105 wt % and about 300 wt %, preferably about 110 wt % to about 230 wt %, more preferably about 120 wt % to about 220 wt %, and still more preferably about 130 wt % to about 200 wt %, of the isocyanate base value.

The isocyanate base value defines the amount of the isocyanate component which is equivalent to 100 parts by weight of the polyol component. The NCO-content (%) of the isocyanate component is defined herein according to DIN ISO 53185. To determine the OH-content (%) of the polyol component, first the so-called OH-number is determined in mg KOH/g according to DIN ISO 53240 and this value is divided by 33, in order to determine the OH-content.

Thus, in step (a) an excess of NCO-groups in the isocyanate component of between about 5 and about 200%, preferably about 10 to about 130%, more preferably about 20% to about 120%, and still more preferably about 30% to about 100%, relative to the OH-groups in the polyol component is used (corresponding to the above mentioned amount of isocyanate component of about 105% to about 300%, preferably about 110% to about 230%, more preferably about 120% to about 220%, still even more preferably about 130% to about 200% of the isocyanate base value).

Moreover, in step (a) one or more additives can be mixed with the proppant, the polyol component and the isocyanate component. These additives are not particularly restricted and can be selected from the additives known in the specific field of coated proppants. Provided that one of these additives has hydroxyl groups, it should be considered as a different hydroxyl-group-containing compound, as described above in connection with the polyol component. If one of the additives has isocyanate groups, it should be considered as a different isocyanate-group-containing compound. Additives with hydroxyl groups and isocyanate groups can be simultaneously considered as different hydroxyl-group-containing compounds and as different isocyanate-group-containing compounds.

The Amine Component

The coating formulation of the present invention also includes a reactive amine component, preferably an amine-terminated compound. This component enhances crosslink density within the coating and, depending on component selection, can provide additional characteristics of benefit to the cured coating. Particularly preferred reactive amine components for use in the present invention include amine-terminated compounds such as diamines, triamines, amine-terminated glycols such as the amine-terminated polyalkylene glycols sold commercially under the trade name JEFFAMINE from Huntsman Performance Products in The Woodlands, Tex.

Suitable diamines include primary, secondary and higher polyamines and amine-terminated compounds. Suitable compounds include, but are not limited to, ethylene diamine; propylenediamine; butanediamine; hexamethylenediamine; 1,2-diaminopropane; 1,4-diaminobutane; 1,3-diaminopentane; 1,6-diaminohexane; 2,5-diamino-2,5-dimethlhexane; 2,2,4- and/or 2,4,4-trimethyl-1,6-diaminohexane; 1,11-diaminoundecane; 1,12-diaminododecane; 1,3- and/or 1,4-cyclohexane diamine; 1-amino-3,3,5-trimethyl-5-aminomethyl-cyclohexane; 2,4- and/or 2,6-hexahydrotoluylene diamine; 2,4' and/or 4,4'-diaminodicyclohexyl methane and 3,3'-dialkyl-4,4'-diamino-dicyclohexyl methanes such as 3,3'-dimethyl-4,4'-diamino-dicyclohexyl methane and 3,3'-diethyl-4,4'-diaminodicyclohexyl methane; aromatic polyamines such as 2,4- and/or 2,6-diaminotoluene and 2,6-diaminotoluene and 2,4' and/or 4,4'-diaminodiphenyl methane; and polyoxyalkylene polyamines (also referred to herein as amine terminated polyethers).

Mixtures of polyamines may also be employed in preparing aspartic esters, which is a secondary amine derived from a primary polyamine and a dialkyl maleic or fumaric acid ester, for use in the invention. Representative examples of useful maleic acid esters include dimethyl maleate, diethyl maleate, dibutyl maleate, dioctyl maleate, mixtures thereof and homologs thereof.

Suitable triamines and higher multifunctional polyamines for use in the present coating include diethylene triamine, triethylenetetramine, and higher homologs of this series.

JEFFAMINE diamines include the D, ED, and EDR series products. The D signifies a diamine, ED signifies a diamine with a predominately polyethylene glycol (PEG) backbone, and EDR designates a highly reactive, PEG based diamine.

JEFFAMINE D series products are amine terminated polypropylene glycols with the following representative structure:

$$H_2N-\underset{CH_3}{CH}-CH_2-[O-CH_2-\underset{CH_3}{CH}]_x-NH_2$$

| JEFFAMINE ® | x | MW* |
|---|---|---|
| D-230 | ~2.5 | 230 |
| D-400 | ~6.1 | 430 |
| D-2000 | ~33 | 2,000 |
| D-4000 (XTJ-510) | ~68 | 4,000 |

JEFFAMINE EDR-148 (XTJ-504) and JEFFAMINE EDR-176 (XTJ-590) amines are much more reactive than the other JEFFAMINE diamines and triamines. They are represented by the following structure:

$$H_2N-\underset{CH_3}{CH}-CH_2-[O]_x-[O-CH_2-\underset{CH_3}{CH}]_y-[O]_z-NH_2$$

| JEFFAMINE ® | y | x + z | MW* |
|---|---|---|---|
| HK-511 | 2.0 | ~1.2 | 220 |
| ED-600 (XTJ-500) | ~9.0 | ~3.6 | 600 |
| ED-900 (XTJ-501) | ~12.5 | ~6.0 | 900 |
| ED-2003 (XTJ-502) | ~39 | ~6.0 | 2,000 |

JEFFAMINE T series products are triamines prepared by reaction of propylene oxide (PO) with a triol intiator followed by amination of the terminal hydroxyl groups. They are exemplified by the following structure:

| JEFFAMINE ® | R | n | (x + y + z) | MW* |
|---|---|---|---|---|
| T-403 | C₂H₅ | 1 | 5-6 | 440 |
| T-3000 (XTJ-509) | H | 0 | 50 | 3000 |
| T-5000 | H | 0 | 85 | 5000 |

The SD Series and ST Series products consist of secondary amine versions of the JEFFAMINE core products. The SD signifies a secondary diamine and ST signifies a secondary trimine. The amine end-groups are reacted with a ketone (e.g. acetone) and reduced to create hindered secondary amine end groups represented by the following terminal structure:

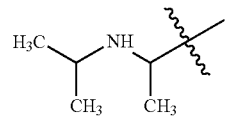

One reactive hydrogen on each end group provides for more selective reactivity and makes these secondary di- and triamines useful for intermediate synthesis and intrinsically slower reactivity compared with the primary JEFFAMINE amines.

| JEFFAMINE ® | Base Product | MW* |
|---|---|---|
| SD-231 (XTJ-584) | D-230 | 315 |
| SD-401 (XTJ-585) | D-400 | 515 |
| SD-2001 (XTJ-576) | D-2000 | 2050 |
| ST-404 (XTJ-586) | T-403 | 565 |

See also U.S. Pat. Nos. 6,093,496; 6,306,964; 5,721,315; 7,012,043; and Publication U.S. Patent Application No. 2007/0208156 the disclosure of which are hereby incorporated by reference.

Optional Amine-Based Latent Curing Agents

Amine-based latent curing agents are optionally added to the coating formulation in the isocyanate component, the polyol component, the amine-reactive polyol component or added simultaneously as any of these components or pre-coated on the proppant. Suitable amine-based latent curing agents for use with the present invention include triethylenediamine; bis(2-dimethylaminoethyl)ether; tetramethylethylenediamine; pentamethyldiethylenetriamine; and other tertiary amine products of alkyleneamines. Additionally, other catalysts that promote the reaction of isocyanates with hydroxyls and amines that are known by the industry can be used in the present invention.

Additives

The proppant coating compositions of the invention may also include various additives. For example, the coatings of the invention may also include pigments, tints, dyes, and fillers in an amount to provide visible coloration in the coatings. Other materials conventionally included in coating compositions may also be added to the compositions of the invention. These additional materials include, but are not limited to, reaction enhancers or catalysts, crosslinking agents, optical brighteners, propylene carbonates, coloring agents, fluorescent agents, whitening agents, UV absorbers, hindered amine light stabilizers, defoaming agents, processing aids, mica, talc, nano-fillers and other conventional additives. All of these materials are well known in the art and are added for their usual purpose in typical amounts. For example, the additives are preferably present in an amount of about 15 weight percent or less. In one embodiment, the additive is present in an amount of about 5 percent or less by weight of the coating composition.

Other additives can include, for example, solvents, softeners, surface-active agents, molecular sieves for removing the reaction water, thinners and/or adhesion agents can be used.

Silanes are a particularly preferred type of adhesion agent that improves the affinity of the coating resin for the surface of the proppant. Silanes can be mixed in as additives in step (a), but can also be converted chemically with reactive constituents of the polyol component or of the isocyanate component. Functional silanes such as amino-silanes, epoxy-, aryl- or vinyl silanes are commercially available and, as described above, can be used as additives or can be converted with the reactive constituents of the polyol component or of the isocyanate component. In particular, amino-silanes and epoxy-silanes can be easily converted with the isocyanate component.

Proppant Core Solids

The proppants can be virtually any small solid with an adequate crush strength and lack of chemical reactivity. Suitable examples include sand, ceramic particles (for instance, aluminum oxide, silicon dioxide, titanium dioxide, zinc oxide, zirconium dioxide, cerium dioxide, manganese dioxide, iron oxide, calcium oxide or bauxite), or also other granular materials. The proppants to be coated preferably have an average particle size within the range from about 50 µm and about 3000 µm, and more preferably within the range from about 100 µm to about 2000 µm.

Coating Method

The method for the production of coated proppants according to the present invention can be implemented without the use of solvents. Accordingly, the mixture obtained in step (a) in one embodiment of the method is solvent-free, or is essentially solvent-free. The mixture is essentially solvent-free, if it contains less than 20 wt %, preferably less than 10 wt %, more preferably less than 5 wt %, and still more preferably less than 3 wt %, and most preferably less than 1 wt % of solvent, relative to the total mass of components of the mixture.

Preferably, the method is implemented without the use of organic solvents. In this case, the mixture obtained in step (a) is free of organic solvents, or is essentially free of organic solvents. The mixture is essentially free of organic solvents, if it contains less than 20 wt %, preferably less than 10 wt %, more preferably less than 5 wt %, and still more preferably less than 3 wt %, and most preferably less than 1 wt % of solvent, relative to the total mass of components of the mixture.

In step (a) the proppant is preferably heated to an elevated temperature and then contacted with the coating components. Preferably, the proppant is heated to a temperature within the range of about 50° C. to about 150° C. to accelerate crosslinking reactions in the applied coating.

The mixer used for the coating process is not particularly restricted and can be selected from among the mixers known in the specific field. For example, a pug mill mixer or an agitation mixer can be used. For example, a drum mixer, a plate-type mixer, a tubular mixer, a trough mixer or a conical mixer can be used. The easiest way is mixing in a rotating drum. As continuous mixer, a worm gear can, for example, be used.

Mixing can be carried out on a continuous or discontinuous basis. In suitable mixers it is possible, for example, to add adhesion agents, isocyanate, amine and optional ingredients continuously to the heated proppants. For example, isocyanate components, amine reactant and optional additives can be mixed with the proppant souds in a continuous mixer (such as a worm gear) in one or more steps to make one or more layers of cured coating.

Preferably, the proppant, isocyanate component, amine reactant and the optional additives are mixed homogeneously. Thus, the isocyanate component and amine reactant are distributed uniformly on the surface of the proppants. The coating ingredients are preferably kept in motion throughout the entire mixing process.

It is also possible to arrange several mixers in series, or to coat the proppants in several runs in one mixer.

The temperature of the coating process is not particularly restricted outside of practical concerns for safety and component integrity. Preferably, the coating step is performed at a temperature of between about 10° C. and about 150° C., or more preferably at a temperature of about 10° C. to about 125° C.

The coating material may be applied in more than one layer. In this case, the coating process is repeated as necessary (e.g. 1-5 times, 2-4 times or 2-3 times) to obtain the desired coating thickness. In this manner, the thickness of the coating of the proppant can be adjusted and used as either a relatively narrow range of proppant size or blended with proppants of other sizes, such as those with more or less numbers of coating layers of polyurethane according to the present invention, so as to form a proppant blend have more than one range of size distribution. A typical range for coated proppant is typically within the range of about 20-70 mesh (841-210 µm).

The amount of coating resin, that is, of the polyurethane resin applied to a proppant, is preferably between about 0.5 and about 10 wt %, more preferably between about 2 and about 5 wt %, resin relative to the mass of the proppant as 100 wt %.

The coated proppants can additionally be treated with surface-active agents or auxiliaries, such as talcum powder or steatite, to improve pourability.

If desired, the coated proppants can be baked or heated for a period of time sufficient to substantially react at least substantially all of the available isocyanate, hydroxyl and reactive amine groups that might remain in the coated proppant. Such a post-coating cure may occur even if additional contact time with a catalyst is used after a first coating layer or between layers. Typically, the post-coating cure step is performed like a baking step at a temperature within the range from about 100°-200° C. for a time of about 1-48 hours, preferably the temperature is about 125°-175° C. for 19-36 hours.

Even more preferably, the coated proppant is cured for a time and under conditions sufficient to produce a coated proppant that exhibits a loss of coating of less than 25 wt %, preferably less than 15 wt %, and even more preferably less than 5 wt % when tested according to ISO 13503-5:2006(E).

Using the Coated Proppants

Furthermore, the invention includes the use of the coated proppants in conjunction with a fracturing liquid for the production of petroleum or natural gas. The fracturing liquid is not particularly restricted and can be selected from among the frac liquids known in the specific field. Suitable fracturing liquids are described, for example, in W C Lyons, G J Plisga, *Standard Handbook Of Petroleum And Natural Gas Engineering*, Gulf Professional Publishing (2005). The fracturing liquid can be, for example, water gelled with polymers, an oil-in-water emulsion gelled with polymers, or a water-in-oil emulsion gelled with polymers. In one preferred embodiment, the fracturing liquid comprises the following constituents in the indicated proportions: 1000l water, 20 kg potassium chloride, 0.120 kg sodium acetate, 3.6 kg guar gum (water-soluble polymer), sodium hydroxide (as needed) to adjust a pH-value from 9 to 11, 0.120 kg sodium thiosulfate, and 0.180 kg ammonium persulfate.

In addition, the invention relates to a method for the production of petroleum or natural gas which comprises the injection of the coated proppant into the fractured stratum with the fracturing liquid, i.e., the injection of a fracturing liquid which contains the coated proppant, into a petroleum- or natural gas-bearing rock layer, and/or its introduction into a fracture in the rock layer bearing petroleum or natural gas. The method is not particularly restricted and can be implemented in the manner known in the specific field.

With the method according to the present invention proppants can be coated at temperatures between about 10° C. and about 150° C. and preferably in a solvent-free manner. The flow back effect can be controlled and adjusted in a reproducible manner. The coating process requires a comparatively little equipment and if necessary can also be carried out on a short-term basis in the vicinity of the bore.

EXAMPLES

Conductivity testing was performed at simulated downhole conditions using the method and procedures found in ISO 13503-5:2006. In such tests, a closure stress is applied across a test unit for 50 hours to allow the proppant sample bed to reach a semi-steady state condition. As the fluid is forced through the proppant bed, the pack width, differential pressure, temperature and flow rates are measured at each stress. Proppant pack permeability and conductivity are then calculated.

Multiple flow rates are used to verify the performance of the transducers, and to determine Darcy flow regime at each stress; an average of the data at these flow rates is reported. The test fluid is potassium chloride substitute solution filtered to 3 μm absolute. The initial conductivity, permeability and width is measured and compared to the final conductivity, permeability and width after each stress period. Stress is applied and maintained using an Isco 260D. Stress is applied at 100 psi/minute.

Width of the proppant pack is determined by assembling the conductivity cell with the Ohio sandstone wafers and shims without the sample proppants. The distance between the width bars that are attached to each end of the conductivity cells are measured at each of the four corners and recorded. The cells are then assembled with the proppant samples. The measurements are made again at the beginning and ending of each stress period. Width is determined by subtracting the average of the zero from the average of each of the stress width values. Conductivity is calculated using Darcy's equation.

Conductivity; $kW_f = 26.78 \mu Q/(\Delta P)$

Permeability; $k = 321.4 \mu Q/[(\Delta P)W_f]$ wherein:
k is the proppant pack permeability, expressed in Darcy's;
$kW_f$ is the proppant pack conductivity, expressed in millidarcy-feet
μ is the viscosity of the test liquid at test temperature, expressed in centipoises;
Q is the flow rate, expressed in cubic centimeters per minute;
ΔP is the differential pressure, expressed in psi;
$W_f$ is proppant pack width, expressed in inches.

Sieve analysis is performed using the procedure found in ISO 13503-2 "Measurements of proppants used in hydraulic fracturing and gravel pack operations" Standard US mesh screens are used to separate the sample by size. Not more than 0.1% should be greater than the first specified sieve and not more than 1% should be retained in the pan. There should be at least 90% retained in the specified screens.

To determine the magnitude of "LOI" loss during the conductivity test, samples of the proppant pack are taken, dried in an oven and weighed. They are then subjected to a temperature of 960 C for 2.5 hours. At the end of this period the samples are cooled and weighed again. The difference between the sample weight after drying but before being subjected to the furnace compared to the sample weight after the time in the furnace, equates to the coating weight. Comparing this number to the same test performed on a sample of the coated material before being subjected to the conductivity test, will equate to the coating weight lost due to the long term exposure to the conditions of the conductivity tests.

The procedure used in an autoclave test would be as follows:

The autoclave test utilizes what amounts to a pressure cooker to subject the coated sands to a hot wet environment that is above the boiling temperature of water. Approximately 20 g of sample is placed in a jar along with 150 ml of distilled water. The lids are placed on sample jars but not tightened. The samples are placed in the autoclave and the chamber is sealed. Heat is applied until the autoclave temperature reaches 250-265° F. (121°-129° C.). The samples are maintained under these conditions for the ten day period. At the end of the test period the autoclave is cooled down, opened and the sample jars removed. Each sample is washed with distilled water and then placed in an oven to dry. The dried samples are then put through a standard test for determination of LOI. This result is compared a the results of an LOI test that was run on the original sample. The difference in LOI before and after the autoclave test, quantifies the amount of LOI dissolved by the exposure to a hot water environment.

Example 1

One kg of sand is preheated to 210° F. (99° C.) and placed in a lab mixer. The following components are added at the times indicated in Table 1 to proppant sand with mixing.

TABLE 1

| Time (sec) | Material(s) Added |
|---|---|
| 0 | Add 1 gm 3-aminopropyltriemethoxysilane |
| 15 | Add 31.2 gms of a mixture of 60% methylene diphenylisocyanate (MDI) oligomers and 40% of a phenolic polyol |
| 45 | Add 7.2 gms of a mixture of 96% JEFFAMINE D230 and 4% diazobicyclooctane (DABCO) |
| 240 | Remove the coated sand, now cooled to a temperature of 140° F. (60° C.) |

The JEFFAMINE D230 is an amine-terminated, polypropylene glycol having the general structure:

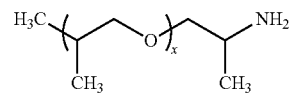

wherein: x is about 2.5 and the average molecular weight is 230.

The final product exhibited excellent thermal properties and low or no loss of coating when immersed in water and subjected to a 250° F. (121° C.) autoclave test for 18 hours.

Example 2

One kg of sand is preheated to 210° F. (99° C.) and placed in a lab mixer. The following components are added at the times indicated in Table 2 to the proppant sand with mixing.

TABLE 2

| Time (sec) | Material(s) Added |
|---|---|
| 0 | Add 1 gm 3-aminopropyltriemethoxysilane |
| 30 | Add 20.0 gms of methylene diphenylisocyanate (MDI) oligomers |
| 75 | Add 12.0 gms of JEFFAMINE D230 |
| 240 | Remove the coated sand, now cooled to a temperature of 130° F. (54° C.) |

The final, coated proppant product exhibited excellent thermal properties and low/no loss of coating when immersed in water and subjected to a 250° F. (121° C.) autoclave test for 18 hours.

Example 3

One kg of sand is preheated to 210° F. (99° C.) and placed in a lab mixer. The following components are added at the times indicated in Table 3 to the proppant sand with mixing.

TABLE 3

| Time (sec) | Material(s) Added |
|---|---|
| 0 | Add 1 gm 3-aminopropyltriemethoxysilane |
| 30 | Add 20.0 gms of methylene diphenylisocyanate (MDI) oligomers |
| 75 | Add 12.6 gms of a mixture containing 95 wt % JEFFAMINE D230 and 5 wt % of a latent crosslinking agent comprising diazobicyclooctane (DABCO) |
| 240 | Remove the coated sand, now cooled to a temperature of 130° F. (54° C.) |

The final product exhibited excellent thermal properties and low/no loss of coating when immersed in water and subjected to a 250° F. (121° C.) autoclave test for 18 hours.

Once those skilled in the art are taught the invention, many variations and modifications are possible without departing from the inventive concepts disclosed herein. The invention, therefore, is not to be restricted except in the spirit of the appended claims.

What is claimed is:

1. Cured, coated, discrete, proppants comprising solid proppant core particles, each with an outer surface that is substantially covered with a cured, substantially homogeneous polyurethane coating that comprises the polyurethane reaction product of an isocyanate component and a polyol reactant that is selected from the group consisting of cashew nut oil, cardanol, cardol, a hydroxy-functional polyether, and castor oil, wherein said polyurethane reaction product was made with an excess of said isocyanate relative to said polyol and wherein said coated and cured proppant solids exhibit an average particle size within the range from about 50 μm to about 3000 μm and sufficient resistance to flowback and sufficiently high crush resistance to maintain conductivity when placed in a subterranean fracture.

2. Proppants according to claim 1 wherein said coated proppants exhibit a loss of coating of less than 15 wt % when tested according to ISO 13503-5:2006(E).

3. Proppants according to claim 1 wherein said polyurethane was made with 105-300 wt.% of isocyanate base value relative to the weight of said polyol.

4. Proppants according to claim 1 wherein said polyurethane was made with 5-200% excess of —NCO groups in said isocyanate relative to —OH groups in said polyol.

5. Proppants according to claim 1 wherein said core is a sand.

6. Proppants according to claim 1 wherein said core is a ceramic.

7. Substantially cured, coated, discrete, proppants comprising solid proppant core particles, each with an outer surface that is substantially covered with a substantially cured, substantially homogeneous polyurethane coating that comprises the polyurethane reaction product of an isocyanate component and a polyol reactant that comprises castor oil, said coated and substantially cured proppant solids exhibiting an average particle size within the range from about 50 μm to about 3000 μm.

8. Proppants according to claim 7 further comprising an adhesion agent that improves affinity of the coating for the outer surface of said proppant core particle.

9. Proppants according to claim 7 wherein said proppant exhibits more than one layer of coating.

10. Proppants according to claim 7 wherein said polyurethane coating is present in an amount within the range from about 0.5-10 wt % of resin relative to the mass of the proppant.

11. Proppants according to claim 7 wherein said coating further comprises a pigment, tint, dye or other coloring agent in an amount sufficient to provide a visible coloration to said coating.

12. Proppants according to claim 7 wherein said core is a sand.

13. Proppants according to claim 7 wherein said core is a ceramic.

14. Proppants according to claim 7 wherein said proppant further comprises an auxiliary agent that improves pourability of said proppant.

15. Proppants according to claim 7 wherein said proppants exhibit resistance to flow back.

16. Cured, coated, proppants comprising solid proppant core particles, each with an outer surface that is substantially covered with a cured, substantially homogeneous polyurethane coating that comprises the polyurethane reaction product of an isocyanate component and a polyol reactant that is selected from the group consisting of cashew nut oil, cardanol, cardol, a hydroxy-functional polyether, and castor oil, said coated and substantially cured proppant solids exhibiting an average particle size within the range from about 50 μm to about 3000 μm, wherein the core particles are coated with an adhesion agent that improves affinity of the polyurethane coating for the outer surface of said proppant core particle, wherein said polyurethane coating was made with an excess amount of isocyanate relative to said polyol reactant, and wherein the coated proppant exhibits sufficient resistance to flowback and sufficiently high crush resistance to maintain conductivity when placed in a subterranean fracture.

17. Proppant solids according to claim 16 wherein the coating was applied when said core solids were at a temperature within the range from about 50° C. and 150° C.

18. Proppants according to claim 16 wherein said polyurethane was made with 105-300 wt.% of isocyanate base value relative to the weight of said polyol.

19. Proppants according to claim 16 wherein said polyurethane was made with 5-200% excess of —NCO groups in said isocyanate relative to —OH groups in said polyol.

* * * * *